United States Patent
Raghavan et al.

(10) Patent No.: US 7,649,960 B2
(45) Date of Patent: Jan. 19, 2010

(54) FEEDBACK AND SCHEDULING SCHEMES FOR A COMMUNICATIONS SYSTEM

(75) Inventors: Vasanthan Raghavan, Champaign, IL (US); Eko N. Onggosanusi, Allen, TX (US); Anand G. Dabak, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 525 days.

(21) Appl. No.: 11/379,003

(22) Filed: Apr. 17, 2006

(65) Prior Publication Data

US 2006/0233272 A1   Oct. 19, 2006

Related U.S. Application Data

(60) Provisional application No. 60/672,193, filed on Apr. 15, 2005, provisional application No. 60/671,668, filed on Apr. 15, 2005.

(51) Int. Cl.
*H04L 27/00* (2006.01)
(52) U.S. Cl. .................. 375/295; 375/260; 375/219; 375/146
(58) Field of Classification Search ............... 375/295, 375/260, 219, 146
See application file for complete search history.

(56) References Cited

U.S. PATENT DOCUMENTS

| 6,434,205 B1* | 8/2002 | Taura et al. .................. 375/355 |
| 7,327,800 B2* | 2/2008 | Oprea et al. .................. 375/267 |
| 2005/0259727 A1* | 11/2005 | Benvenuto et al. .......... 375/233 |

OTHER PUBLICATIONS

Raghavan, et al.; Fall Vehicular Technology Conference (2005); "Single Rate Communication is Advantageous Over Per-Tone Rate Control in a Multi-User OFDM System"; Dallas, TX; Sep. 25-28, 2005; 5 pgs.

* cited by examiner

*Primary Examiner*—Ted M Wang
(74) *Attorney, Agent, or Firm*—Ronald O. Neerings; Wade James Brady, III; Frederick J. Telecky, Jr.

(57) ABSTRACT

The present invention provides a transmitter. In one embodiment, the transmitter includes a coefficient circuit configured to generate coefficients of a set of basis waveforms that represent channel quality metrics and a transmit circuit that transmits the coefficients. The present invention also provides a receiver. In one embodiment, the receiver includes a receive circuit configured to receive coefficients of a set of basis waveforms that represent channel quality metrics and a reconstruction circuit configured to reconstruct the channel quality metrics from the coefficients.

37 Claims, 10 Drawing Sheets

FEEDBACK AND SCHEDULING SCHEMES FOR A COMMUNICATIONS SYSTEM

CROSS-REFERENCE TO PROVISIONAL APPLICATION

This application claims the benefit of U.S. Provisional Application No. 60/672,193 entitled "A Feedback and Scheduling Scheme for a Cellular OFDM System" to Vasanthan Raghavan, Eko N. Onggosanusi and Anand G. Dabak, filed on Apr. 15, 2005, which is incorporated herein by reference in its entirety. Additionally, this application also claims the benefit of U.S. Provisional Application No. 60/671,668 entitled "An Efficient Uplink Feedback Scheme for a Single Rate Cellular OFDM System" to Vasanthan Raghavan, Eko N. Onggosanusi and Anand G. Dabak, filed on Apr. 15, 2005, which is incorporated herein by reference in its entirety.

TECHNICAL FIELD OF THE INVENTION

The present invention is directed, in general, to wireless communications and, more specifically, to a transmitter and a receiver, methods of operating a transmitter and a receiver and a communications system employing the transmitter, the receiver and the methods.

BACKGROUND OF THE INVENTION

Per-tone control of a cellular OFDM system provides a scheme where the base station allocates an OFDM tone to a particular user who has the best channel conditions for that tone, so as to maximize the average throughput of the system. In contrast to a per-tone rate control of a cellular OFDM, a single-rate scheme allocates all of the OFDM tones to a particular user who has the best channel quality indicator (CQI) and communication is established using a fixed modulation and coding scheme (MCS) across all the tones. The per-tone rate control scheme achieves the maximum multiplexing gain possible whereas the single-rate scheme achieves the maximum diversity gain possible.

The feedback requirement for per-tone rate control on the uplink is directly proportional to the number of OFDM tones, while on the downlink, the broadcast requirement is proportional to the number of users serviced in the cellular system and the number of modulation and coding schemes in the MCS set. Thus, it is imperative that efficient feedback and scheduling schemes for a high load, multi-carrier system with a large number of data carriers be employed.

In a multi-user, multi-carrier cellular OFDM system employing per-tone rate control, the base station has to know the amplitude of the channel frequency response of the different users, so that it can assign each OFDM tone to the user with the best channel conditions for that tone. One way to effect this feedback is to communicate the channel frequency response across the data tones from each user to the base station. The feedback requirement with this scheme is directly proportional to the number of data tones, and is operationally prohibitive in a system with a large number of data carriers.

A simple feedback scheme may be developed if realistic physical channels can be modeled accurately with a few uncorrelated filter taps. The user then feeds back the quantized channel taps to the base station. The base station estimates the amplitude of the channel frequency response from the channel taps that are fed back. This scheme requires a feedback rate proportional to the number of filter taps modeling the channel between the base station and the user. The disadvantage with this scheme is that, since channel coefficients change randomly from one time instantiation to another, the effective feedback rate is also proportional to the rate of change of channel coefficients, which is usually high for a fading wireless channel.

The single-rate scheme minimizes the feedback on the downlink when compared with a per-tone rate control scheme, since only one user and MCS information has to be transmitted for all the OFDM tones. Here, the downlink feedback is immensely reduced as the base station has to inform the users of only one allocated user and MCS information. However, without further information, the uplink feedback requirement remains the same, as each user has to communicate the CQI for all the data tones.

Accordingly, what is needed in the art is an enhanced way to overcome these disadvantages and limitations.

SUMMARY OF THE INVENTION

To address the above-discussed deficiencies of the prior art, the present invention provides a transmitter. In one embodiment, the transmitter includes a coefficient circuit configured to generate coefficients of a set of basis waveforms that represent channel quality metrics and a transmit circuit that transmits the coefficients. The present invention also provides a receiver. In one embodiment, the receiver includes a receive circuit configured to receive coefficients of a set of basis waveforms that represent channel quality metrics and a reconstruction circuit configured to reconstruct the channel quality metrics from the coefficients.

In another aspect, the present invention provides a method of operating a transmitter. In one embodiment, the method includes generating coefficients of a set of basis waveforms that represent channel quality metrics and transmitting the coefficients. The present invention also provides a method of operating a receiver, and in one embodiment, the method includes receiving coefficients of a set of basis waveforms that represent channel quality metrics and reconstructing the channel quality metrics from the coefficients.

The present invention also provides, in yet another aspect, a communications system. The communications system includes a transmitter having a coefficient circuit that generates coefficients of a set of basis waveforms, which represent channel quality metrics, and a transmit circuit that transmits the coefficients. The communications circuit also includes a receiver having a receive circuit that receives the coefficients and a reconstruction circuit that reconstructs the channel quality metrics from the coefficients.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
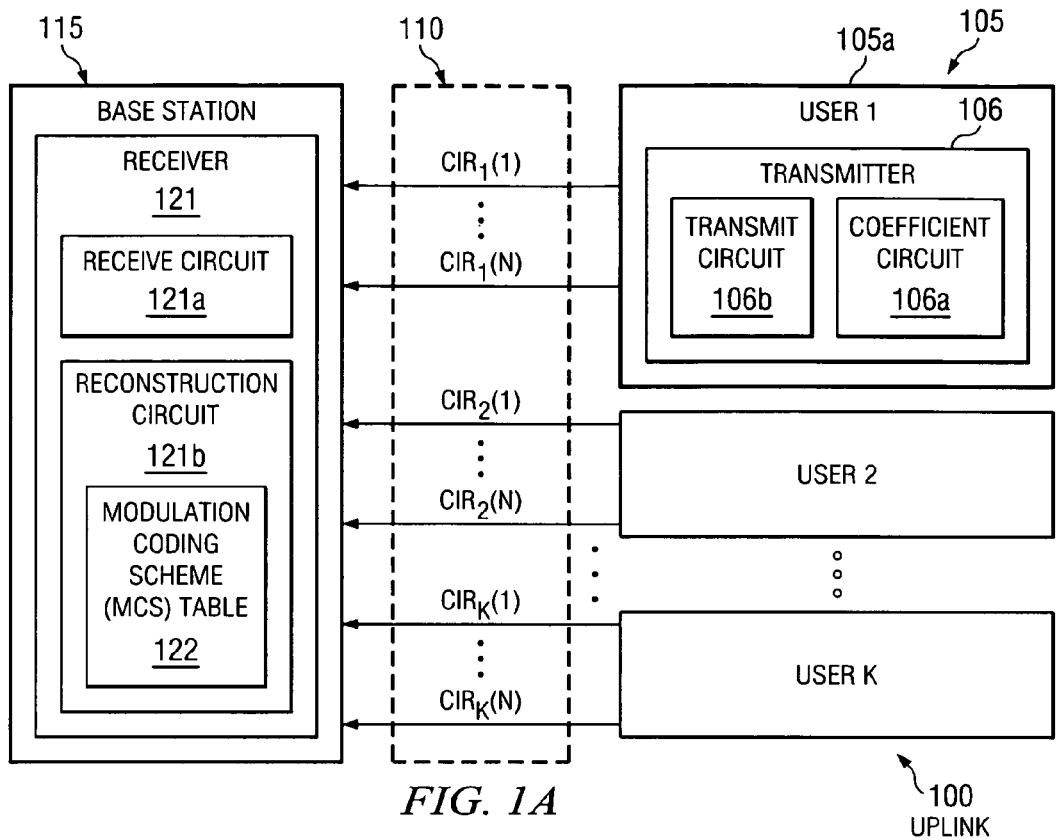
FIGS. 1A and 1B illustrate system diagrams of embodiments of an uplink portion and a downlink portion of a communications system.
Figure 1B:
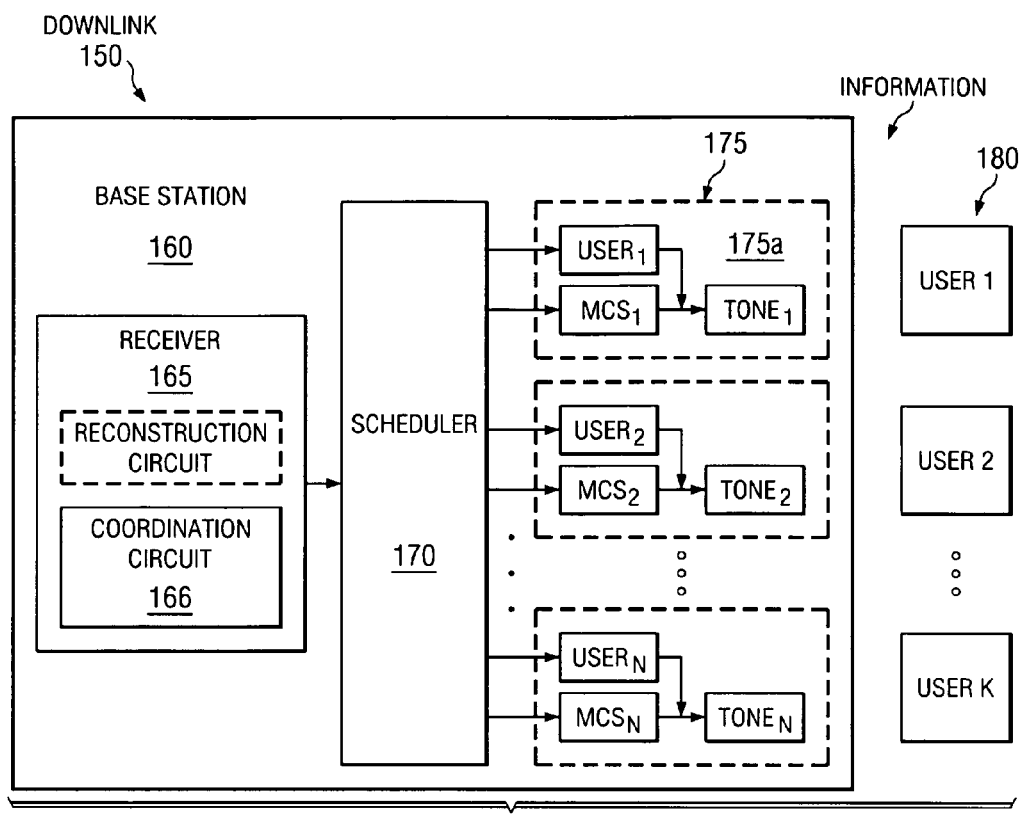

FIGS. 1A and 1B illustrate system diagrams of embodiments of an uplink portion 100 and a downlink portion 150 of a communications system. In the illustrated embodiment, the communications system is an OFDM system. The illustrated uplink portion 100 includes a plurality of users 105 wherein a first user 105a is representative. The uplink portion 100 also includes a plurality of carrier-to-interference ratios (CIRs) 110, also called channel quality indicators (CQIs), corresponding to the plurality of users 105 that are provided over a wireless CIR control channel to a base station 115. Since the terms CIR and CQI can be used interchangeably and are representative of channel quality metrics, they will be used specifically in subsequent discussions.

In the uplink portion 100, the first user 105a includes a transmitter 106 that has a coefficient circuit 106a and a transmit circuit 106b. The transmitter 106 is representative of transmitters in the remaining plurality of users 105. The base station 115 includes a receiver 121 that has a receive circuit 121a and a reconstruction circuit 121b. In the illustrated embodiment, the reconstruction circuit 121b includes a modulation coding scheme (MSC) table 122.

The illustrated downlink portion 150 includes a base station 160 and a plurality of users 180. The downlink portion 150 also includes a receiver 165 coupled to a scheduler 170 that provides a plurality of tone groupings 175 wherein a first tone group 175a is representative. The receiver 165 includes a coordination circuit 166 that is coupled to a reconstruction circuit such as the reconstruction circuit 121b of FIG. 1A.

The coefficient circuit 106a generates coefficients of a set of basis waveforms that represent channel quality metrics. The transmit circuit 106b then transmits these coefficients to the receiver 121 employing a portion of the plurality of carrier-to-interference ratios (CIRs) 110, as shown. The receive circuit 121a receives the coefficients and the reconstruction circuit 121b reconstructs the channel quality metrics from the coefficients. Additionally the coordination circuit 166 provides reconstructions of the channel quality metrics for scheduling and partitions groups of data tones into contiguous single-user tone blocks based on the channel quality metrics.

Embodiments of the present invention provide an efficient uplink feedback technique for the OFDM system employing either per-tone rate control or single-rate control. One embodiment, associated with per-tone rate control, feeds back quantized expansion coefficients of the squared-amplitude of the channel frequency response, which decorrelate very quickly thereby reducing the feedback requirement. These quantized expansion coefficients are representative of the CIRs mentioned above. Additionally, a downlink scheduling technique that reduces the amount of data transferred in the control channels is also discussed. Another embodiment, employing single-rate control, uses a modulation coding scheme table or listing to reduce the feedback requirement.

Scheduling employs tone grouping that partition the OFDM tones into groups such that a single user is serviced within a group. Additionally, MCS sub-grouping is provided that partitions a given user serviced tone group further into sub-groups such that a fixed MCS is used within each sub-group. An adaptive MCS set reduction scheme that further reduces feedback is also provided.

Simulations illustrate the advantage of the proposed schemes over current, existing schemes. It may be shown that 34 bits on the uplink portion 100, and 220 bits on the downlink portion 150 are sufficient for a 10-user system to achieve an average throughput that is within 10 percent of the ideal throughput, even at very low values of the ratio of Cell Power to Additive White Gaussian Noise (AWGN) power (i.e., $I_{or}/I_{oc}$ values).

One of the feedback techniques presented is dependent on the second-order statistics of a fading channel. Second order channel statistics may remain stationary on the order of seconds. Thus, a slow variation of the second order statistics of the channel, when compared to the channel itself, allows the effective feedback rate employing this feedback technique to be lower than a conventional feedback technique needed to achieve the same performance.

In one embodiment employing per-tone rate control, an uplink feedback technique may be implemented wherein the basis waveforms employ a sinusoidal-based transform such as the discrete Fourier transform in the following scheme. Consider the inverse Fourier transform $z(n)$ of the squared-amplitude of the channel frequency response across the data tones as seen by a given user. It is straightforward to note the following simplification of $z(n)$.

$$z(n) = \frac{1}{\sqrt{N}} \sum_{k=0}^{N-1} |H_f(k)|^2 \exp\left(\frac{j2\pi kn}{N}\right) \quad (1)$$

$$= \frac{1}{\sqrt{N}} \sum_{i=0}^{N-1} h(i) h^*((i+n) \bmod N),$$

where $$H_f(k) = \frac{1}{\sqrt{N}} \sum_{i=0}^{N-1} h(i) \exp\left(\frac{j2\pi ki}{N}\right), \quad (2)$$

with $h(i)$ being the channel tap coefficients, and N being the number of useful data tones. Also note the following conjugate symmetric property of $z(n)$ due to the positivity of $|H_f(k)|^2$:

$$z(n) = z^*(N-n) \quad n=1,\ldots,N/2-1. \quad (3)$$

If N>>K, where K is the number of filter taps used to model the channel, as is usually the case, the quantity z(N/2) (assuming that N is even) is zero.

The expansion (inverse Fourier) coefficients z(n) are the correlation coefficients of the channel taps connecting one of the plurality users 105 to the base station 115. Thus the technique is dependent on the second order statistics of the channel, rather than the channel itself. Also, in Rayleigh fading, the channel taps are uncorrelated zero mean random variables, which suggests a fast decorrelation of the correlation coefficients in equation (1) due to the Weak Law of Large Numbers. In the case of Ricean fading, the same intuition holds if the number of Line of Sight (LOS) channel taps is assumed to be one.

The technique employed in this embodiment is motivated by the decorrelation property of the expansion coefficients. Each user quantizes scaled versions of the D.C. coefficient and a first portion of remaining coefficients, which are the first $L-1$ coefficients of the Fourier expansion in equation (1) and transmits them back to the base station 115. The choice of L is determined by the average speed at which the channel coefficients decorrelate. The quantization strategy is addressed below.

The integer part and the decimal part of $\sqrt{N}z(0)$ are quantized with an integer-part bit set of $B_{int}(0)$ bits and a decimal-part bit set of $B_{dec}(0)$ bits, respectively. If $\sqrt{N}z(0)$ has an integer part that is greater than $2^{B_{int}(0)}-1$, then it is floored and quantized to $2^{B_{int}(0)}-1$. For the decimal part, the interval [0,1) is partitioned into $2^{B_{dec}(0)}$ contiguous equal length sub-intervals. The decimal part is quantized to the middle-point of the sub-interval in which it falls.

The scaled versions of the n-th frequency coefficient ($\sqrt{N}z(n)$) use a real-part bit set of $B_R(n)$ bits for the real part and an imaginary-part bit set of $B_I(n)$ bits for the imaginary part quantization. The plurality of users 105 and the base station 115 agree on the dynamic range of the quantization scheme a priori, depending on the long-term channel statistics. Let the quantization range for the real and the imaginary parts of the frequency coefficients be denoted by $D_R(n)$ and $D_I(n)$ respectively.

The procedure may be illustrated with the real part of the frequency component. Appropriate modifications are made for the imaginary parts. The interval $[-D_R(n), D_R(n)]$ is partitioned into $2^{B_R(n)}$ contiguous, equal length sub-intervals. If $|\Re[\sqrt{N}z(n)]|>D_R(n)$, then it is quantized to the middle-point of either the two boundary sub-intervals closest to $\sqrt{N}z(n)$. Otherwise it is quantized to the middle-point of the sub-interval in which it falls.

Let $\bar{z}(n)$ be the reconstructed version of z(n) at the base station assuming no error in the feedback link. The reconstructed frequency profile at a transmitter F(k) is then given by $$F(k) = |H_f(k)|^2 - E(k), \quad (4)$$

where the error E(k) is given by:

$$E(k) = \frac{1}{\sqrt{N}} \sum_{n=0}^{N-1} e(n) \exp\left(\frac{-j2\pi kn}{N}\right) \quad (5)$$

$$e(n) = \begin{cases} z(n) - \bar{z}(n), & 0 \leq n \leq L-1 \\ z(n), & L \leq n \leq N-L \\ z(n) - \bar{z}(n), & N-L+1 \leq n \leq N-1 \end{cases}.$$

The symmetry in the coefficients of e(n) is due to the conjugate symmetry of z(n).

It may be noted that the integer part of z(0) can be quantized with practically zero error. The worst-case error of e(0) due to quantization of the decimal part of z(0) is seen to be $$\frac{1}{2^{B_{dec}(0)+1}}.$$

Similarly, the worst-case error of z(n) for those n that are quantized is seen to be $$\frac{D_R(n)}{2^{B_R(n)}} + \frac{D_I(n)}{2^{B_I(n)}}.$$

The following then serves as an upper bound on the worst-case error of E(k):

$$|E(k)| \leq \frac{1}{2^{B_{dec}(0)+1}} + \sum_{n=1}^{L-1}\left(\frac{D_R(n)}{2^{B_R(n)-1}} + \frac{D_I(n)}{2^{B_I(n)-1}}\right) + \Delta, \quad (6)$$

where $\Delta$ is the sum of the non-quantized frequency components. Note that $\Delta$ decreases as L increases. Thus with a judicious choice of L, $B_R(n)$ and $B_I(n)$, it is possible to reconstruct the frequency profile accurately.

Other quantization strategies for the correlation coefficients (such as quantizing the amplitude and phase components of or amplitudes and phases in dB scale) do not work as well as the real and imaginary components quantization. This is because the dynamic range of the phase component of z(n) is $2\pi$ (due to the random nature of the correlation coefficients), which is much larger than the dynamic range of the real (or imaginary) components of z(n) for practical wireless channels.

Figure 2A:
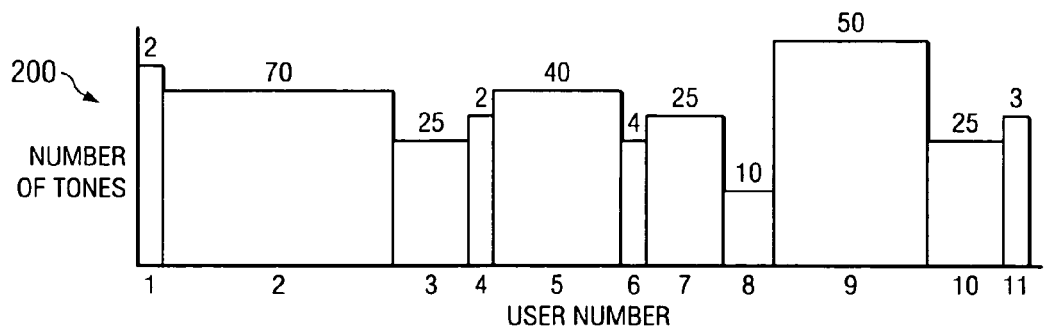
FIGS. 2A and 2B illustrate an embodiment of a tone grouping technique employed for a number of the plurality of users in a downlink scheduling scheme.
Figure 2B:
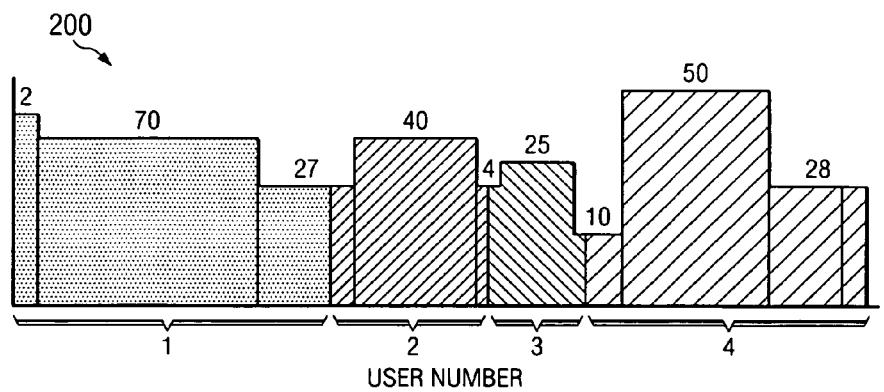

FIGS. 2A and 2B illustrate an embodiment of a tone grouping technique 200 employed for a number of the plurality of users 180 in a downlink scheduling scheme. FIG. 2A shows a number of tones for each user and FIG. 2B shows an embodiment of corresponding tone groupings.

Given that the base station 160 knows an estimate of a channel frequency response's squared-amplitude, it schedules a tone to a user having the best channel conditions. The base station 160 then has to communicate the scheduled user information, via control channels, for each tone to the users 180 so that the relevant users can decode the information symbols intended for them. In systems with a large number of data tones, such an overhead becomes prohibitive. Therefore there is a need to partition the set of data tones into contiguous blocks where only one from the plurality of users 180 is scheduled per block. This partitioning scheme is aided by the observation that the frequency response varies slowly across tones. That is, if a particular user is scheduled for a given tone, then it is very likely that the same user is scheduled in a tone neighborhood containing that tone.

In employing the tone grouping technique, the base station 160 employs the downlink scheduling coordinator 166 to first allocate the users to each tone using the scheduling criterion. Then, the base station selects the largest tone groups B where the user to be scheduled within a group remains fixed. The tones that have not been allocated to any user in the previous step are then contiguously allocated to one of the two (possibly one) nearest neighboring users already allocated. The criterion used in performing this "user interpolation" is to choose that neighbor that maximizes the sum of the CIRs in the non-allocated tones.

FIG. 2A shows the users that are actually scheduled across the data tones. The heights of the blocks represent the average CIR as seen by a particular user in these data tones. These users could be scheduled using the maximum CIR criterion (or another scheduling criterion), for example. FIG. 2B shows the users that are scheduled with the proposed tone grouping technique. Here, B is equal to four, which represents the largest contiguous blocks of users chosen. Additionally, data tones that are not scheduled in this step are contiguously scheduled to either of the two nearest neighbor users that have been already scheduled.

Figure 3A:
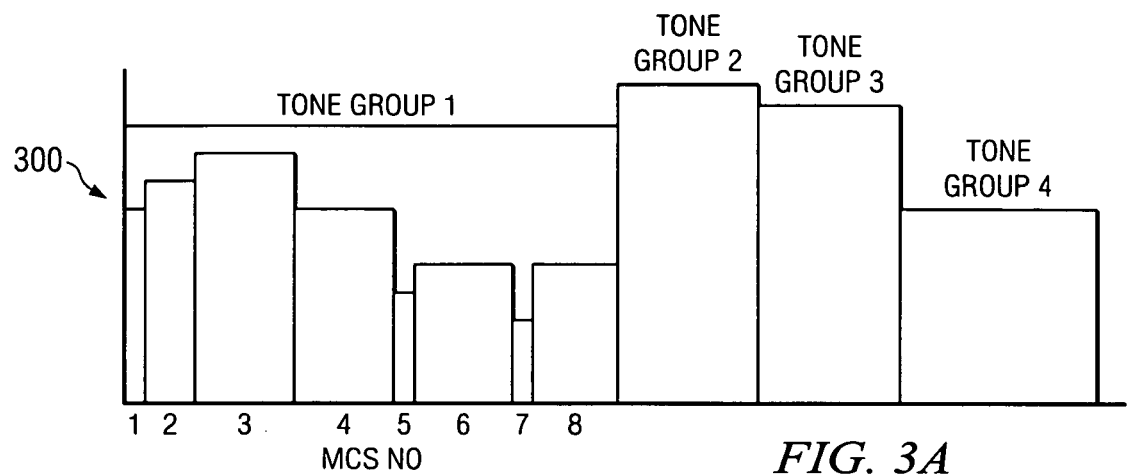
FIGS. 3A and 3B illustrate an embodiment of an MCS sub-grouping technique that may be further employed with a tone grouping technique such as the one discussed with respect to FIG. 2B.
Figure 3B:
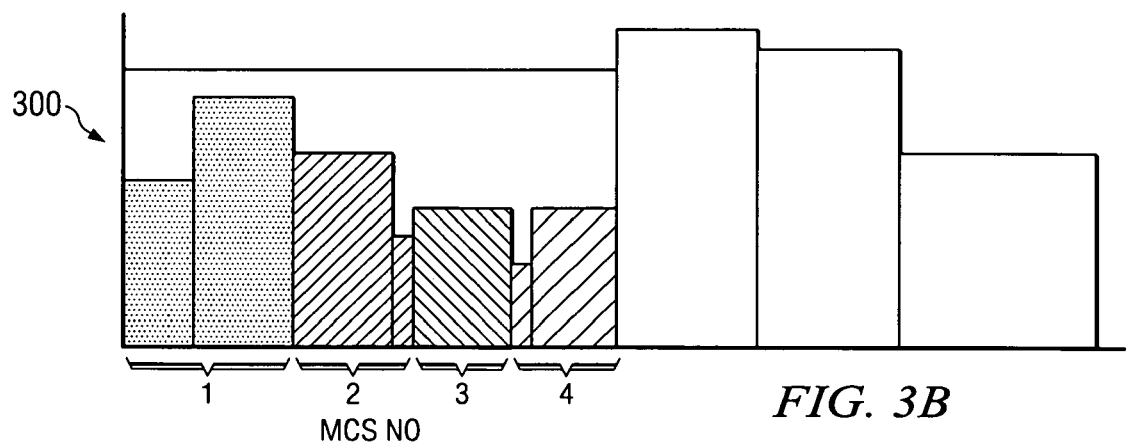

FIGS. 3A and 3B illustrate an embodiment of an MCS sub-grouping technique 300 that may be further employed with a tone grouping technique such as the one discussed with respect to FIG. 2B. Repetition coding is a coding strategy used to increase the reliability of transmitted signals in the event of channel outage or noise. Communication of signals uses one of the many standard modulation schemes, such as 8-PSK, QPSK, 16-QAM, or 64-QAM, for example. Thus, to transmit information to a receiver, a transmitter has a wide range of adaptive MCS (modulation with repetition coding) from which to choose. However the transmitter is constrained by the fact that correct decoding of symbols at the receiver cannot take place without knowledge of the MCS.

Thus the transmitter has to communicate to the receiver what MCS has been used for each tone along with the user information for that tone. A large cardinality of the allocatable MCS set implies a large overhead of transmission of such information. One way to decrease this overhead is to reduce the cardinality of this set. Embodiments of the present invention employ an MCS sub-grouping scheme that follows the tone grouping technique discussed above.

The following assumes that B users (that are not necessarily all different) have been scheduled with the tone grouping technique discussed above, and one of these B tone groups is addressed for simplicity. First, the base station 160 allocates an optimal MCS that maximizes the average throughput to the different tones within the tone group. The MCS sub-grouping technique then proceeds along the same lines as the tone grouping technique, and C largest contiguous MCS sub-groups are identified within a given tone group wherein an "MCS interpolation" similar to that performed in tone grouping is performed.

FIG. 3A shows the MCS schemes that are actually allocated within a first tone group Tone Group 1. FIG. 3B shows that a C equal to four sub-groups is formed within Tone Group 1 with the four largest contiguous sub-groups as the backbone. The tones that are not assigned an MCS here are assigned contiguously to one of the two MCSs associated with the neighboring tones. As expected, the larger B and C are, the closer the throughput of the scheme is to the ideal throughput.

The following notation may be employed to characterize the signaling requirement of the scheduling technique: U is the number of users, B is the number of tone groups, C is the number of MCS sub-groups per tone group, and M is the cardinality of the MCS set used for information transmission. Assume that both the base station 160 and the users 180 know, via some higher level information exchange, what the values of B,C,U, and M are, or that these quantities do not change in the time period of interest. Additionally, assume that the only uncertainty is in which users are serviced in the different tone groups, or what MCS is used in each MCS sub-group. Also assume that the index of useful data tones is known at the users 180.

Based on these assumptions, the base station 160 communicates to the users 180 the following information: for every tone group, the user serviced with a given tone group, the number of tones allotted to the different MCS sub-groups within this tone group and the MCS index for each sub-group. Then, it is straightforward to compute the average signaling requirement in terms of the defined quantities as $$B\left[\log_2(U) + C\left[\log_2(M) + \log_2\left(\frac{N}{BC}\right)\right]\right],$$

where the quantity $$\frac{N}{BC}$$

is the average number of tones per MCS sub-group.

Further reduction in feedback rate is possible by addressing MCS set cardinality reduction. The objective is to reduce the original MCS set to a cardinality M subset where M is as small as possible commensurate with a minimal throughput loss. An adaptive strategy is employed where the MCS subset is dependent on the $I_{or}/I_{oc}$ ratio.

It may be noted that at high $I_{or}/I_{oc}$ values, a very high throughput must be ideally achievable. Any such throughput-achieving modulation and signaling scheme will correspondingly have a high throughput rate. Similarly, for low $I_{or}/I_{oc}$ values, a signaling scheme at low rates is necessary. Embodiments of the adaptive scheme employ this philosophy, and it is assumed that both the base station 160 and the mobile users 180 have an accurate knowledge of the $I_{or}/I_{oc}$ value. This is possible by employing either a long-term averaging of channel statistics or a link level (or higher level) communication between the base station 160 and the users 180.

In one embodiment, it is assumed that both the base station 160 and the users 180 have an MCS table which contains the different MCS arranged in an increasing order of rates. The MCS subset chosen is a contiguous subset of $\{1, \ldots, P\}$ with cardinality M where P is the cardinality of the MCS set. Then, the only parameter to be chosen is the MCS scheme with the smallest rate that falls within this subset. This smallest rate scheme in the subset is chosen for different $I_{or}/I_{oc}$ values via a numerical investigation of throughput.

Simulations were employed to verify the results presented above. The simulations assume that N=256 data tones are used for communication, a frame error rate of 10 percent, 10 users and a Ped. B channel are employed. The Ped. B channel results in a 5-tap (complex) filter delay line model. The average throughput of the per-tone rate control system, $TP_{per-tone}$ is defined as follows:

$$TP_{per-tone} = E\left[\sum_{k=1}^{N} TP_k\right] \quad (7)$$

$$TP_k = (1 - FER(CIR^{i_k, MCS_k})) \cdot Rate_{MCS_k},$$

where the user $i_k$ and modulation scheme $MCS_k$ are scheduled for tone number k, $CIR^{i_k, MCS_k}$ is the CIR for the scheduled user with this MCS, FER(CIR$^{i_k, MCS_k}$) is the frame error rate at this CIR value, Rate$_{MCS_k}$ is the rate afforded by the MCS under consideration, and averaging is done over the random channel realizations.

Addressing uplink feedback first, the quantity z(0) is a positive real number. It may be noted that the typical dynamic range of $\sqrt{N}$z(0) is between zero and four for most channels that occur in practice. This can be explained by:

$$\sqrt{N}\, z(0) = \sum_{k=0}^{N-1} |H_f(k)|^2 = \sum_{i=0}^{N-1} |h(i)|^2, \qquad (8)$$

where the last equality follows from Parseval's formula, and the dynamic range may be predicted under the modeling assumption of few non-vanishing filter tap coefficients. Similarly, the dynamic range for the real and imaginary components of $\sqrt{N}$z(n), n>1 are between −1 and 1. The following parameters are used in the uplink feedback technique simulation: $D_R(n)=D_I(n)=1$, n>1 and $B_{int}(0)=2$. Further, quantization strategies with L=4 are considered and details are tabulated in Table 1, where the number of bits used for quantization in the various schemes is shown.

TABLE 1

| Scheme number | $B_{int}$ (0) | $B_{dec}$ (0) | $B_I$ (1) | $B_R$ (1) | $B_I$ (2) | $B_R$ (2) | $B_I$ (3) | $B_R$ (3) | Total bits |
|---|---|---|---|---|---|---|---|---|---|
| 1 | 2 | 2 | 2 | 2 | 2 | 2 | 2 | 2 | 16 |
| 2 | 2 | 2 | 3 | 3 | 3 | 3 | 3 | 3 | 22 |
| 3 | 2 | 2 | 4 | 4 | 3 | 3 | 4 | 4 | 26 |
| 4 | 2 | 2 | 4 | 4 | 4 | 4 | 4 | 4 | 28 |
| 5 | 2 | 2 | 5 | 5 | 5 | 5 | 5 | 5 | 34 |

Figure 4A:
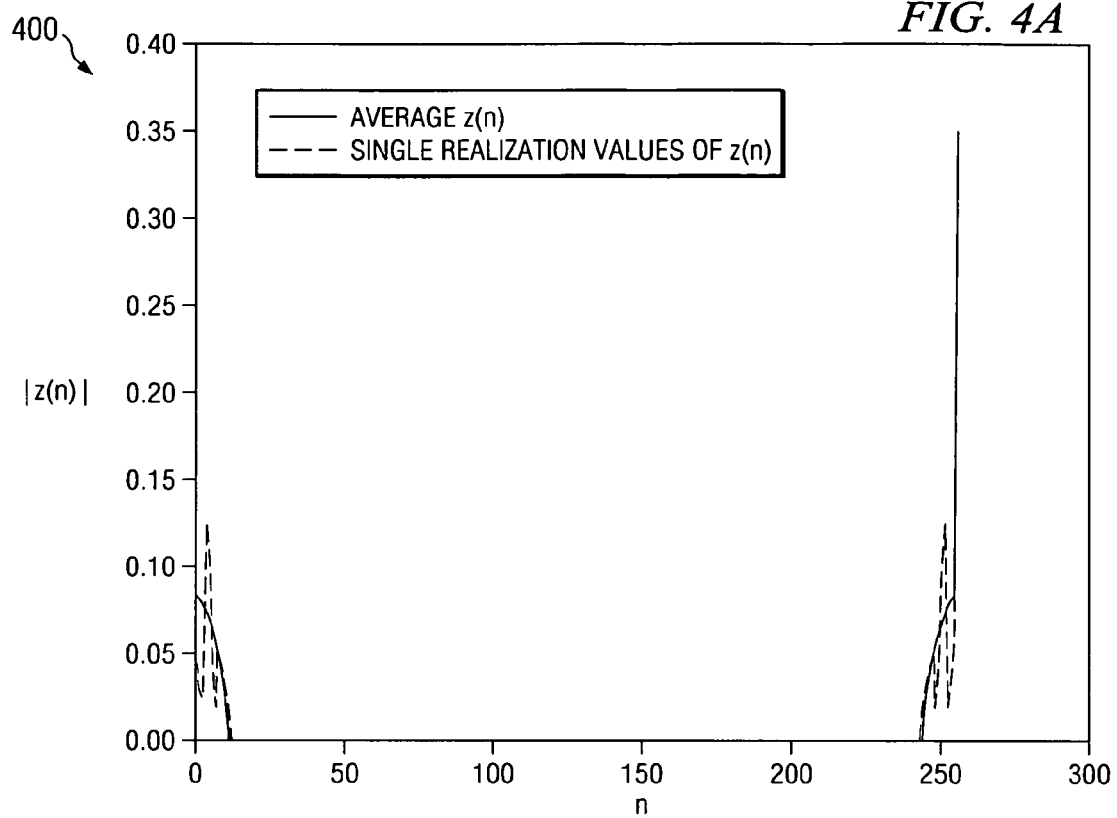
FIGS. 4A-4D illustrate simulation results for an uplink feedback scheme constructed in accordance with the principles of the present invention.

FIGS. 4A-4D illustrate simulation results, generally designated 400, for an uplink feedback scheme constructed in accordance with the principles of the present invention. FIG. 4A characterizes the behavior of the expansion coefficients averaged over many channel realizations. A typical channel realization plot is also shown. Random uncorrelated channel taps are simulated, average values of z(n) and z(n) for a particular realization of h(i) are plotted. Fast vanishing of z(n) as n increases may also be seen. The non-zero components of z(n) as n→N are due to the circular symmetry in the definition of equation (1).

Figure 4B:
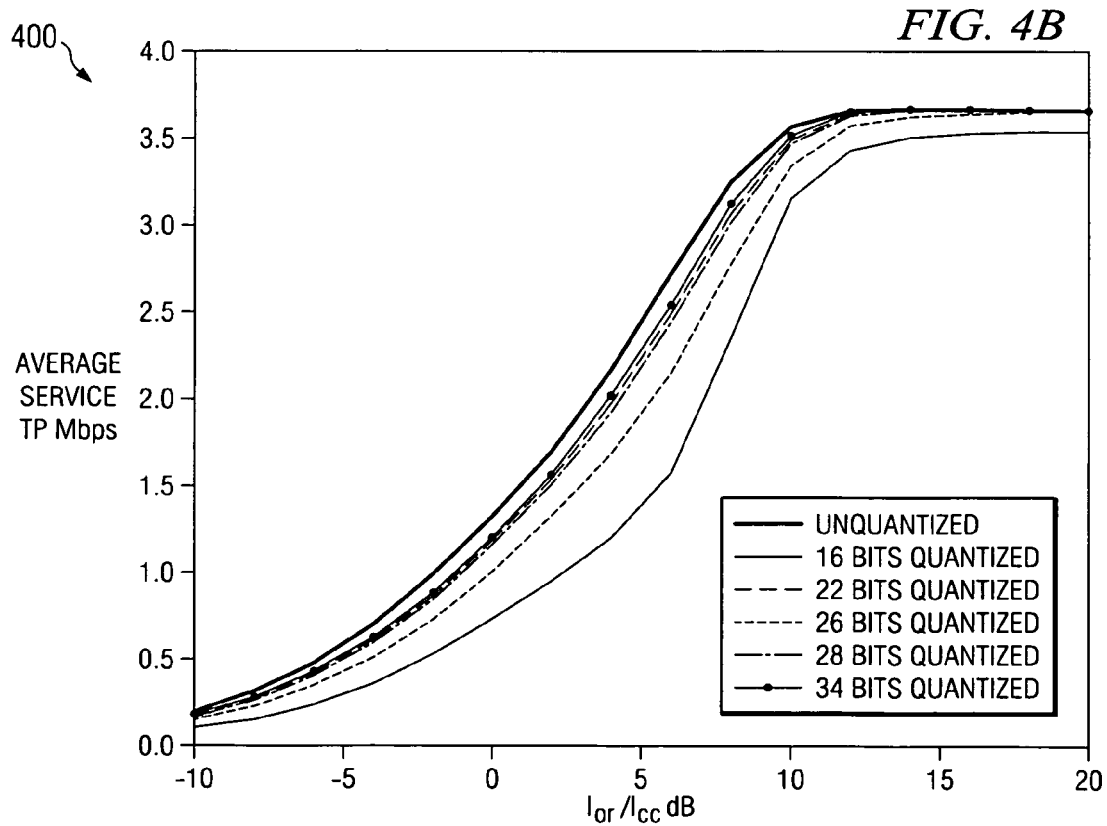
Figure 4C:
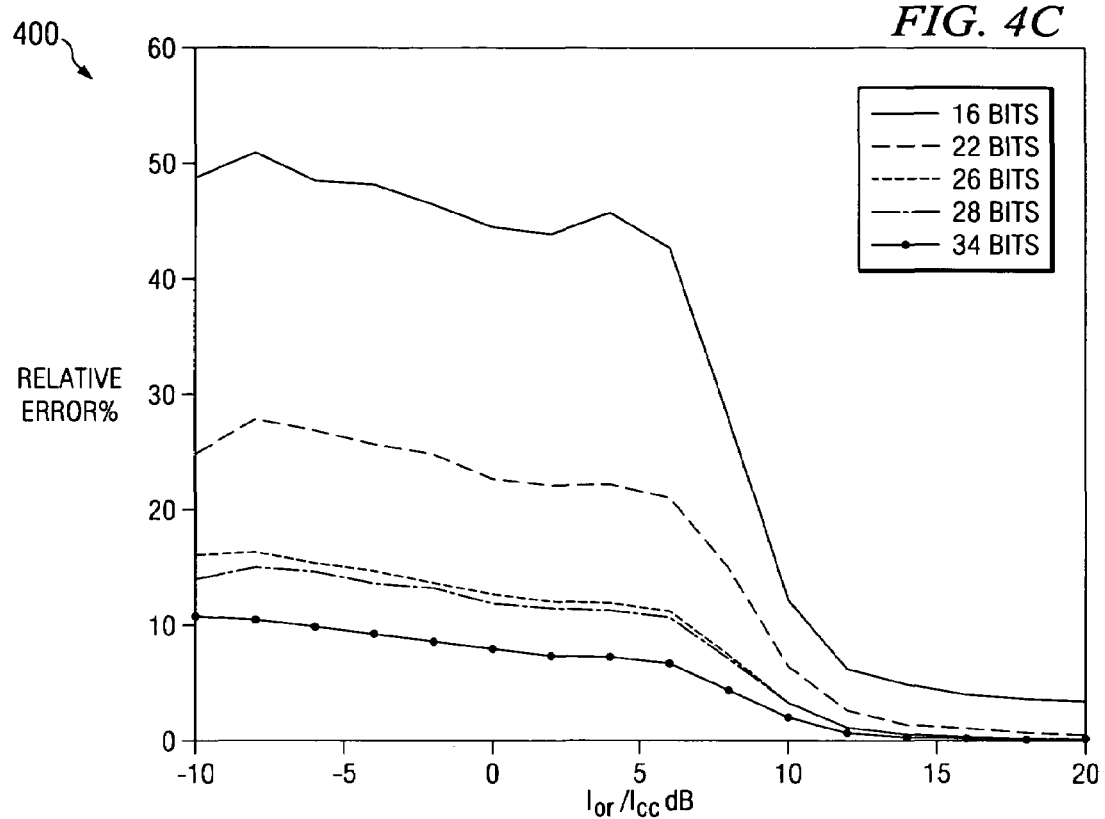
Figure 4D:
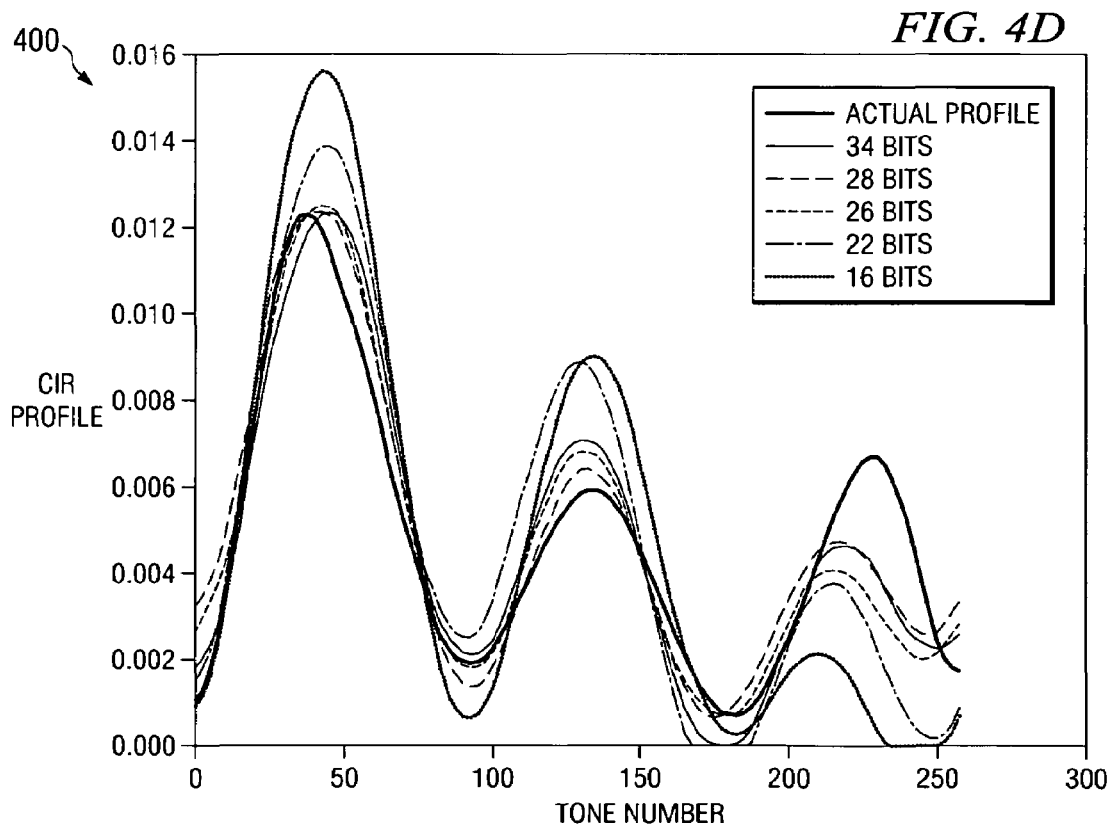

FIG. 4B shows the average service throughput as a function of $I_{or}/I_{oc}$ for the various quantization schemes in Table I. The increase in average throughput may be noted as the number of bits allocated for quantization increases. FIG. 4C shows the relative loss in throughput of these quantization schemes when compared to the unquantized case. FIG. 4D shows the fidelity of reproduction of the frequency profile with these quantization schemes. The frequency profile of a particular user is plotted here. Also plotted are the reconstructed profiles for the different quantization schemes. This plot shows that as the number of bits used for quantization increases, higher fidelity in reproducing the frequency profiles is achieved.

It may be seen from the FIGS. 4A-4D that with 34 bits of uplink feedback, the average throughput is within 10 percent of the ideal throughput even at very low $I_{or}/I_{oc}$ values. With a similar amount of feedback for the conventional technique (that feeds back the filter taps), 3.4 bits per real filter tap are provided (due to a 5-tap model), which is lower than the five bits per real coefficient feedback achieved with our scheme. The dynamic range of the filter taps is of approximately the same order as that of the expansion coefficients, and thus a poorer performance with the conventional technique could be expected. However, the most important advantage of the new scheme is the robustness of second-order variations, which is an improvement over the conventional technique.

FIGS. 5A-5D illustrate simulation results, generally designated 500, for a downlink scheduling scheme constructed in accordance with the principles of the present invention. In addressing downlink scheduling and with suitable choices of B and C in the tone groupings and MCS sub-groupings, not only can the downlink feedback be significantly reduced, but a minimal reduction in the average throughput can also be achieved compared to the ideal throughput.

Figure 5A:
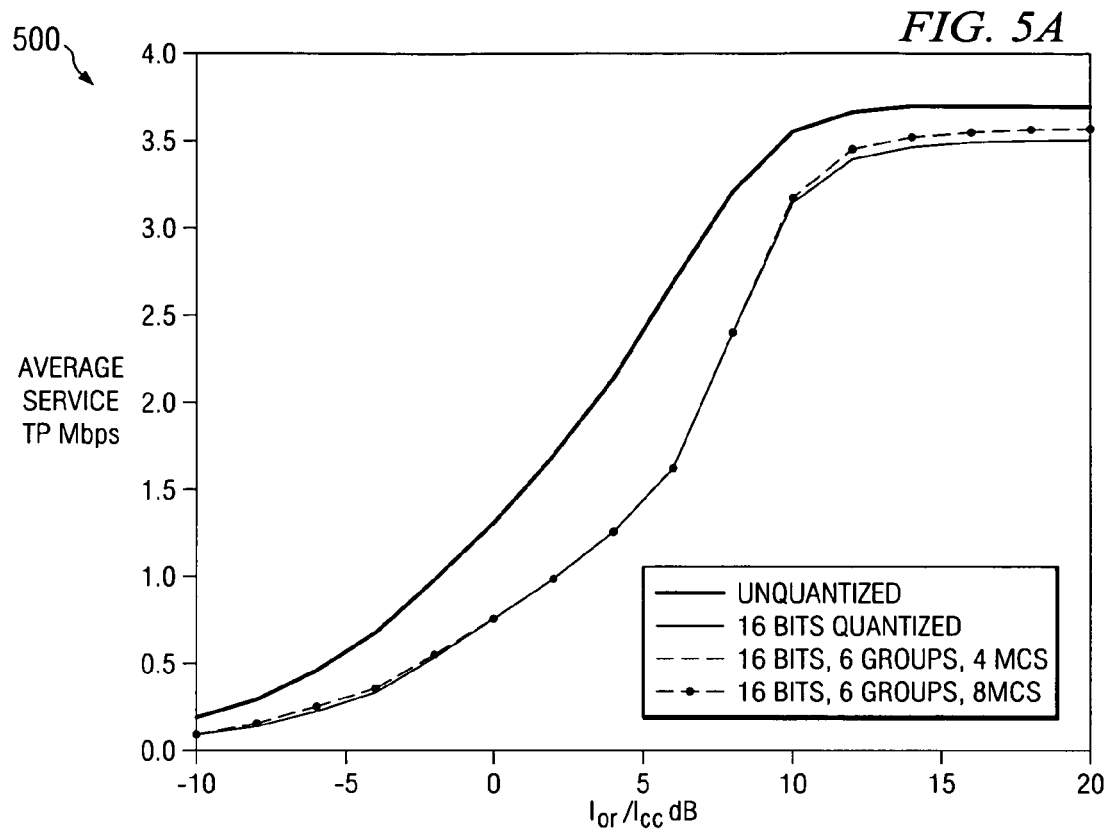
FIGS. 5A-5D illustrate simulation results for a downlink scheduling scheme constructed in accordance with the principles of the present invention.
Figure 5B:
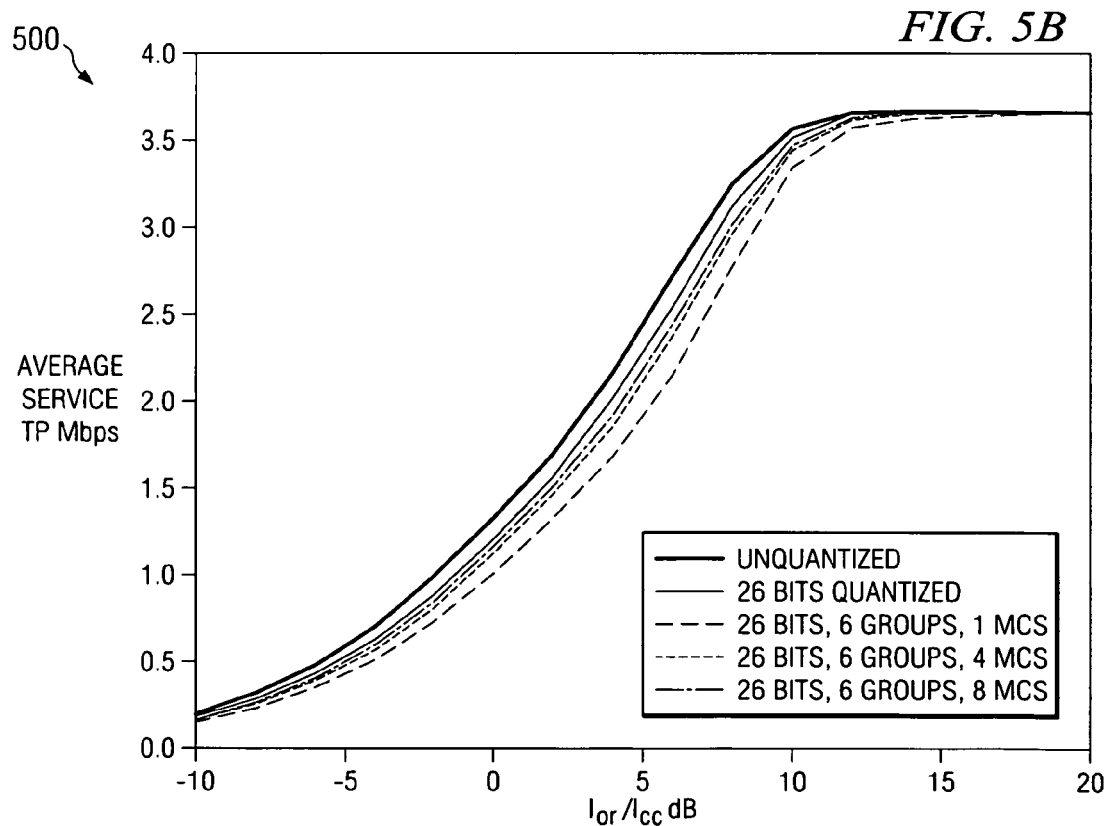
Figure 5C:
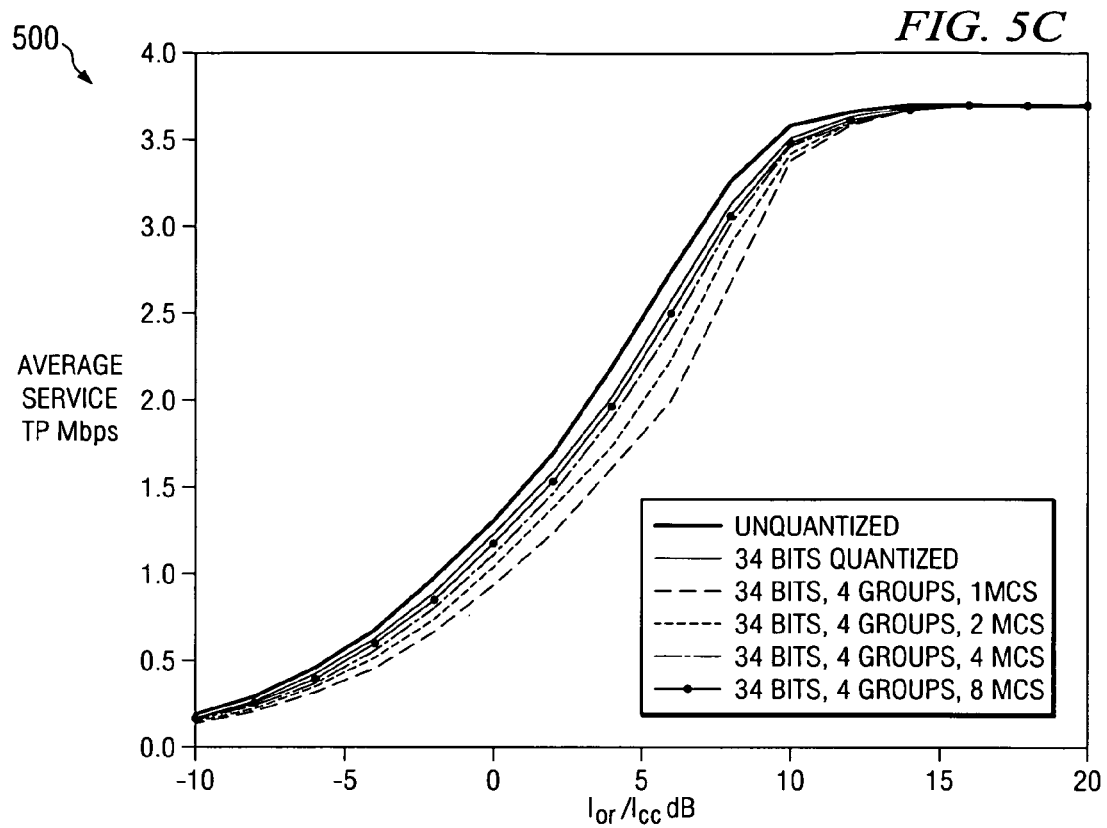
Figure 5D:
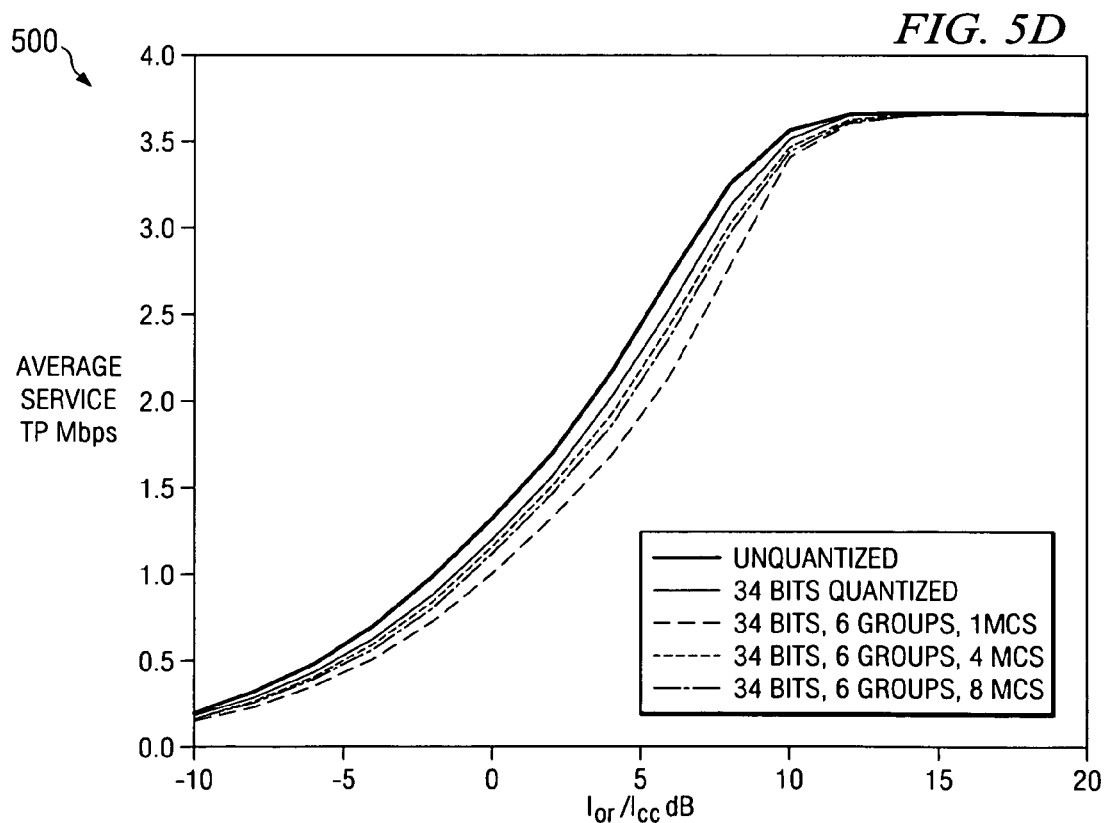

FIG. 5A shows the average service throughput plotted as a function of $I_{or}/I_{oc}$ for B=6 with different C for 16 bits of quantization in the uplink feedback. FIG. 5B shows the average service throughput plotted as a function of $I_{or}/I_{oc}$ for B=6 with different C for 26 bits of quantization in the uplink feedback. As the uplink feedback becomes more coarse, a major penalty in throughput is seen due to the errors in reconstructing the frequency profile. The average signaling requirement with B=5, C=6, U=10 and M=12 is approximately 220 bits. FIGS. 5C and 5D show the average service throughput with 34 bits of quantization on the uplink plotted as a function of $I_{or}/I_{oc}$ with B=4 and 6, with different C, respectively. As can be seen, the throughput reduction is less than 10 percent. These results may be compared with the performance of lower levels of uplink quantization as shown in FIGS. 5A and 5B.

Figure 6A:
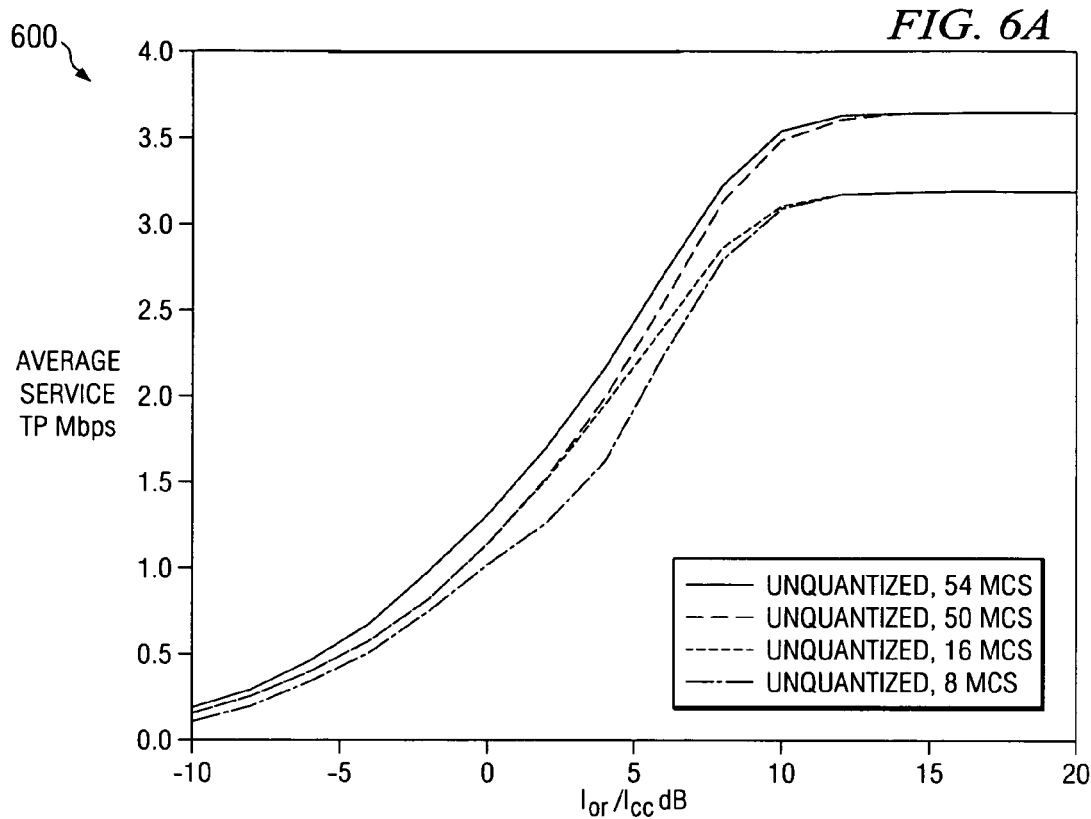
FIGS. 6A-6D illustrate simulation results that address MCS set cardinality reduction constructed in accordance with the principles of the present invention.
Figure 6B:
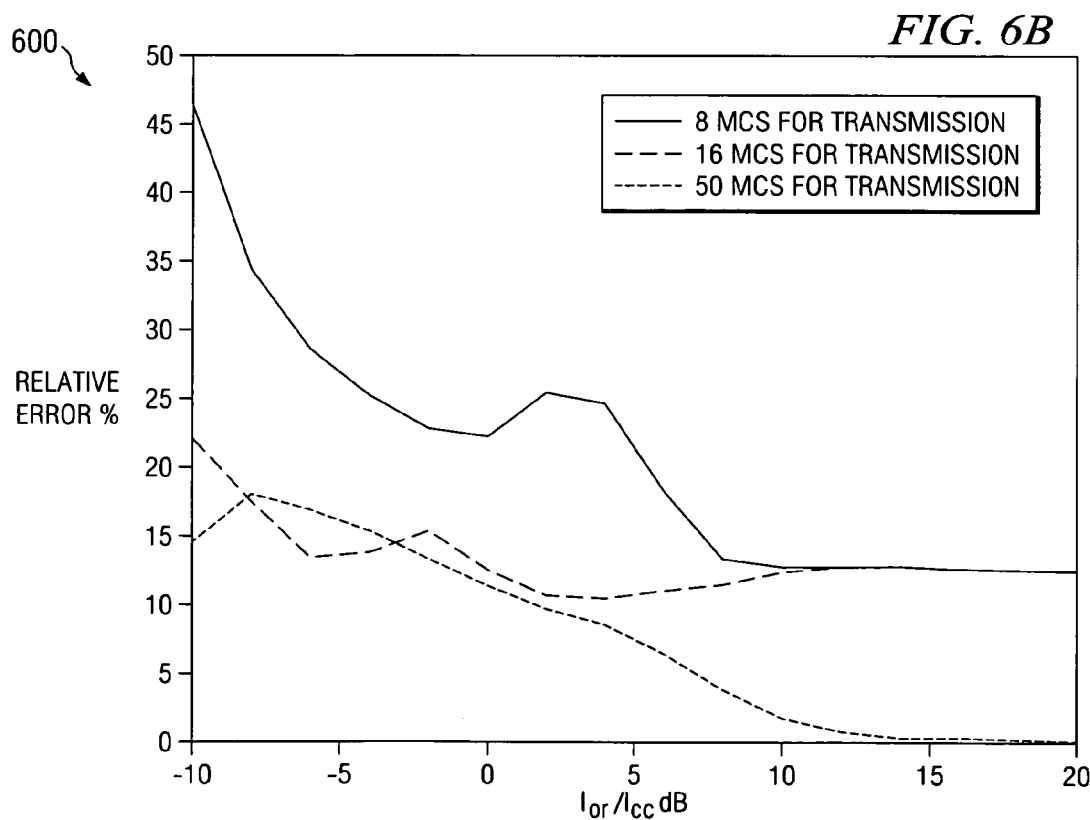

FIGS. 6A-6D illustrate simulation results, generally designated 600, that address MCS set cardinality reduction constructed in accordance with the principles of the present invention. In addressing MCS set cardinality reduction, it is first shown that the Lloyd-Max MCS set reduction strategy performs poorly for high $I_{or}/I_{oc}$, especially for low MCS subset sizes. This is illustrated in FIGS. 6A and 6B, which show the error floor provided by this set reduction strategy at high $I_{or}/I_{oc}$ values. A downlink scheduler that uses a B equal to five tone groups and a C equal to four MCS sub-groups per tone group is assumed. The reason for this poor performance is that as the cardinality of the MCS subset decreases, Lloyd-Max type techniques do not produce a "dense" subset of the original MCS set. However for low $I_{or}/I_{oc}$ ratios, the Lloyd-Max produces a sufficiently dense subset to achieve good performance.

The adaptive MCS set reduction technique may be contrasted with the same downlink scheduler architecture. Table 2 lists the MCS that are a part of the original MCS set (The number of repetitions in the scheme are in MATLAB notation) while Table 3 tabulates the MCS that are used as a function of $I_{or}/I_{oc}$.

TABLE 2

| Modulation Scheme Number | Modulation Scheme | Rate | Number of Repetitions |
|---|---|---|---|
| 1 | QPSK | 1/4 | [2:2:32] |
| 2 | QPSK | 1/2 | [2:2:32] |
| 3 | QPSK | 3/4 | [2:2:32] |
| 4 | 16-QAM | 1/2 | [2:2:32] |
| 5 | 16-QAM | 5/8 | [2:2:32] |
| 6 | 16-QAM | 3/4 | [2:2:32] |

TABLE 3

| $I_{or}/I_{oc}$ (in dB) | Beginning MCS Number | Ending MCS Number |
|---|---|---|
| −10 | 1 | 12 |
| −8 | 3 | 14 |
| −6 | 6 | 17 |
| −4 | 9 | 20 |
| −2 | 15 | 26 |
| 0 | 21 | 32 |
| 2 | 26 | 37 |
| 4 | 32 | 43 |
| 6 | 37 | 48 |
| ≧8 | 42 | 53 |

It may be noted that there are M=53 schemes in the original MCS set. The FIGS. 6A-6D show that the adaptive scheme performs very efficiently for all $I_{or}/I_{oc}$ values, as may be seen from the error plots.

Figure 6C:
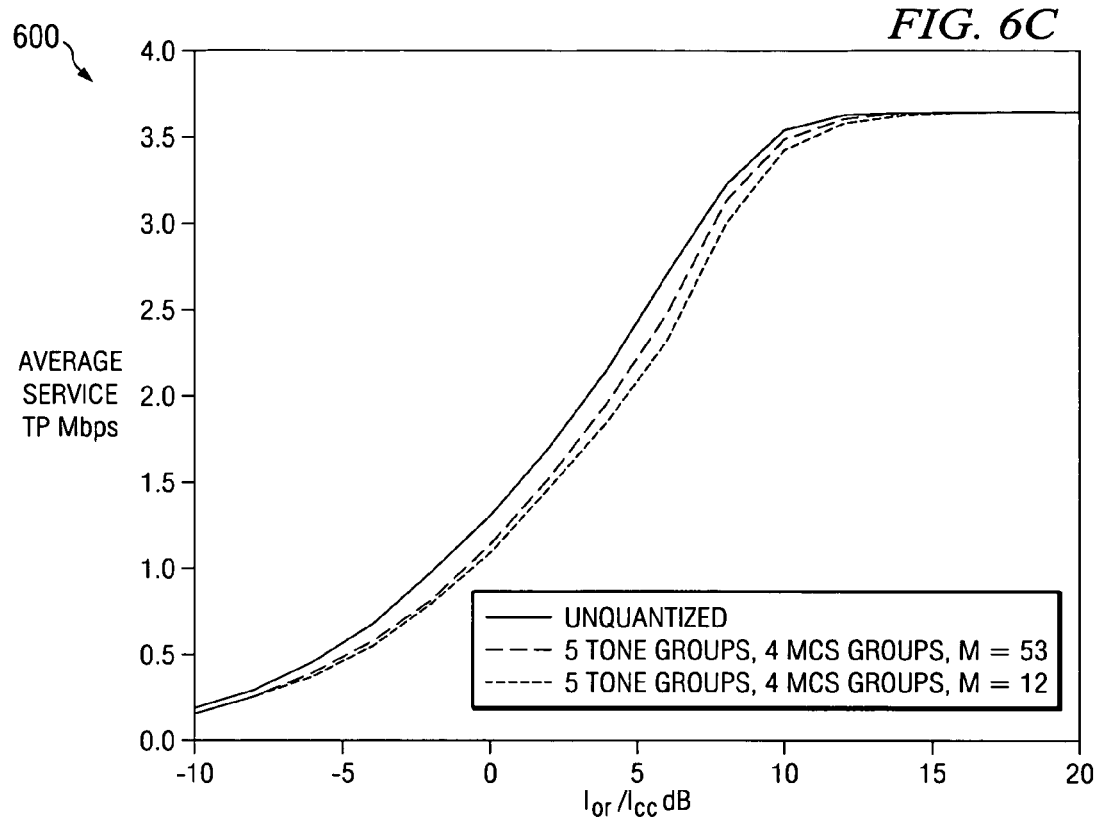
Figure 6D:
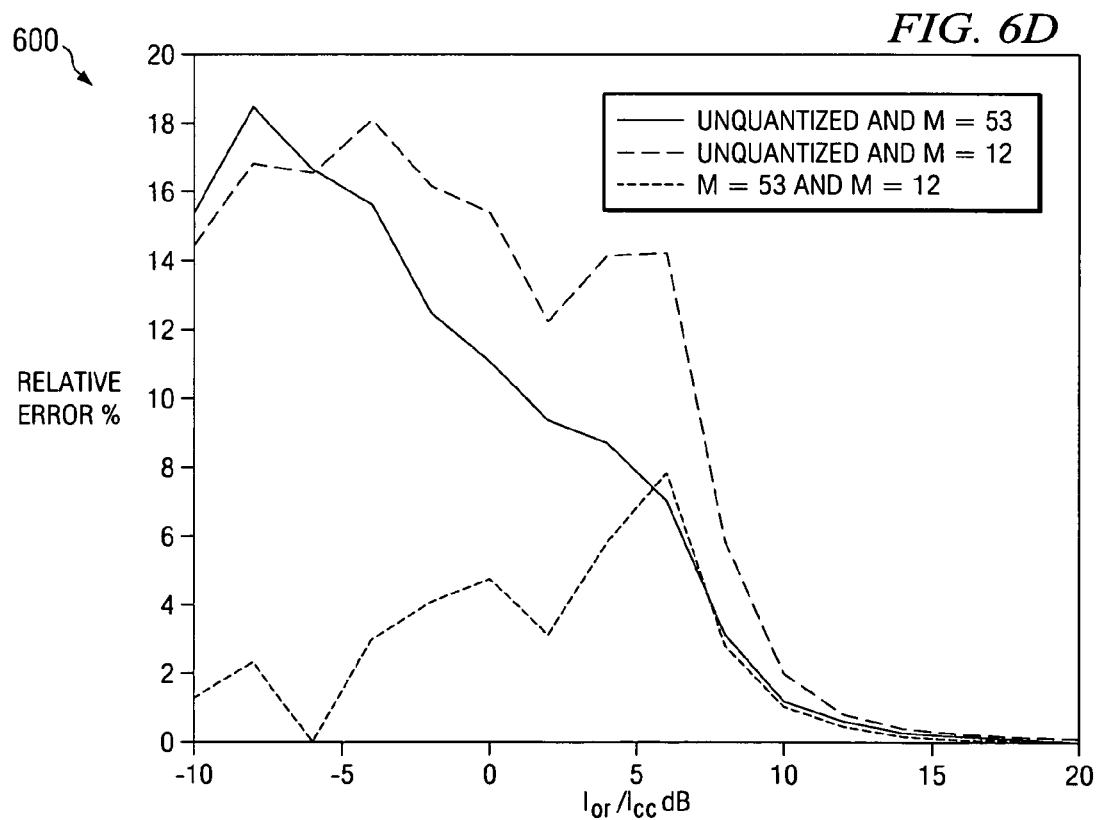

FIG. 6A shows an average throughput with Lloyd-Max quantization of the MCS set and downlink scheduling that uses five tone groups and a maximum of four MCS subgroups per tone group as a function of the MCS set size. FIG. 6B shows relative differences in the throughput for the schemes described in FIG. 6A. FIG. 6C shows the average throughput with M=12. The downlink scheduler uses five tone groups and a maximum of four MCS sub-groups per tone group. FIG. 6D shows relative differences in the throughput for the schemes described in FIG. 6C.

Returning now to FIG. 1A, an embodiment of an uplink feedback scheme for single-rate control is discussed. Let h={h(i)} denote random channel tap coefficients used to model a channel between the base station 115 and the first user 105a and let $H_f(k)$ denote the frequency response of the channel taps. Also, let $N_{SD}$ denote the number of data subcarriers. A capacity-based effective SIR mapping function $SIR_{cap}(h)$ may be defined as:

$$R_{eff} = \frac{1}{N_{SD}} \sum_{k=0}^{N_{SD}-1} C_{MCS}\left(\frac{|H_f(k)|^2}{Q}\right),$$ (9)

$$SIR_{cap}(h) = QC_{MCS}^{-1}(R_{eff})$$

where Q is the gap to capacity of the actual AWGN performance and $C_\alpha(\rho)$ is the capacity of a single-input single-output (SISO) channel employing α as the MCS to transmit information at an SNR of ρ. The methodology to compute the capacity function is straightforward and optimization over Q for each MCS is done so that the capacity-based SIR metric accurately describes link level performance.

Communication between the base station 115 and the various users 105 is accomplished using a predetermined MCS set. The base station 115 requires the reconstruction circuit 121b to know the CQIs of all the modulation schemes in the MCS set. To understand this stringent requirement, consider the user that is to be scheduled information for the given channel realization. It may be that the base station 115 is not able to use the modulation scheme that maximizes the average throughput due to power constraints (or some other constraint such as resources) at the base station 115. Therefore the base station 115 may be forced to choose the second-best scheme (or the best scheme in a subset of the possible modulation and coding schemes) from the MCS set. If a user were to feed back the CQI of all the modulation schemes in the MCS set, each of the users 105 would then be required to communicate as many parameters as there are MCS schemes in that set. For a system with a large MCS set, this quickly becomes impractical.

It may be noted that the capacity functions of different MCS in equation (9) show an approximate trend of a logarithmic behavior at low SNRs and saturation at high SNRs. At low $I_{or}/I_{oc}$ values, the argument to the capacity function in equation (9) is small. Also note that for small x, log(1+x)≈x and thus the Q term effectively cancels itself out in equation (9). Therefore, the effective SIR of an MCS is the sum of two terms, one of which is independent of the MCS (but dependent on the channel), and the other dependent only on the repetition factor of the MCS. It may be shown that for low $I_{or}/I_{oc}$ values:

$$SIR_{cap}^{MCS_1}(h) - SIR_{cap}^{MCS_2}(h) \approx 10 \log_{10}(Rep_{MCS_1}) - 10 \log_{10}(Rep_{MCS_2}),$$ (10)

where $Rep_{MCS_i}$ and $SIR_{cap}^{MCS_i}(h)$ correspond, respectively, to the repetition factor and the CQI of the scheme $MCS_i$. Therefore, equation (10) may be employed to reconstruct a CQI associated with another MCS. Additionally, the receiver 121 includes an MCS table 122 having associations between corresponding CQI and MCS pairs for such a purpose.

For example, prior to communication, one of the users 105 (e.g., the first user 105a) and the base station 115 agree on an arrangement of the different MCS schemes in the MCS table 122 (increasing rate, increasing repetition factor, etc.). The first user 105a then feeds back the scheme number and the effective SIR of that MCS scheme, which minimizes the mean squared error in reconstruction of the effective SIR table, based on the discussion above. That is, the first user 105a feeds back $j_{min}$ and $SIR_{cap}^{MCS_{jmin}}(h)$, where:

$$j_{min} = \operatorname*{argmin}_j \sum_{i=1}^{P} \left[ SIR_{cap}^{MCS_i}(h) - SIR_{cap}^{MCS_j}(h) - 10\log_{10}(Rep_{MCS_i}) + 10\log_{10}(Rep_{MCS_j}) \right]^2,$$ (11)

and P is the total number of MCS schemes in the MCS set. A straightforward extension of this technique is one where either the mean-squared error in equation (10) is computed over a subset of the MCS schemes or a weighted mean-squared error is considered.

Once the base station 115 knows the values of $j_{min}$ and $SIR_{cap}^{MCS_{jmin}}(h)$, it reconstructs the CQI table for the different schemes using equation (10). The feedback requirement may be further reduced if both the base station 115 and the first user 105a agree on feeding back the effective SIR metric of a fixed scheme. This alleviates having to feed back the scheme number in the proposed technique. However, there is a tradeoff in the reconstruction error of the effective SIR table and the feedback requirement in the uplink. Recall that the first user 105a is representative of the plurality of users 105, and therefore, the discussion above applies to each of the plurality of users 105.

Figure 7:
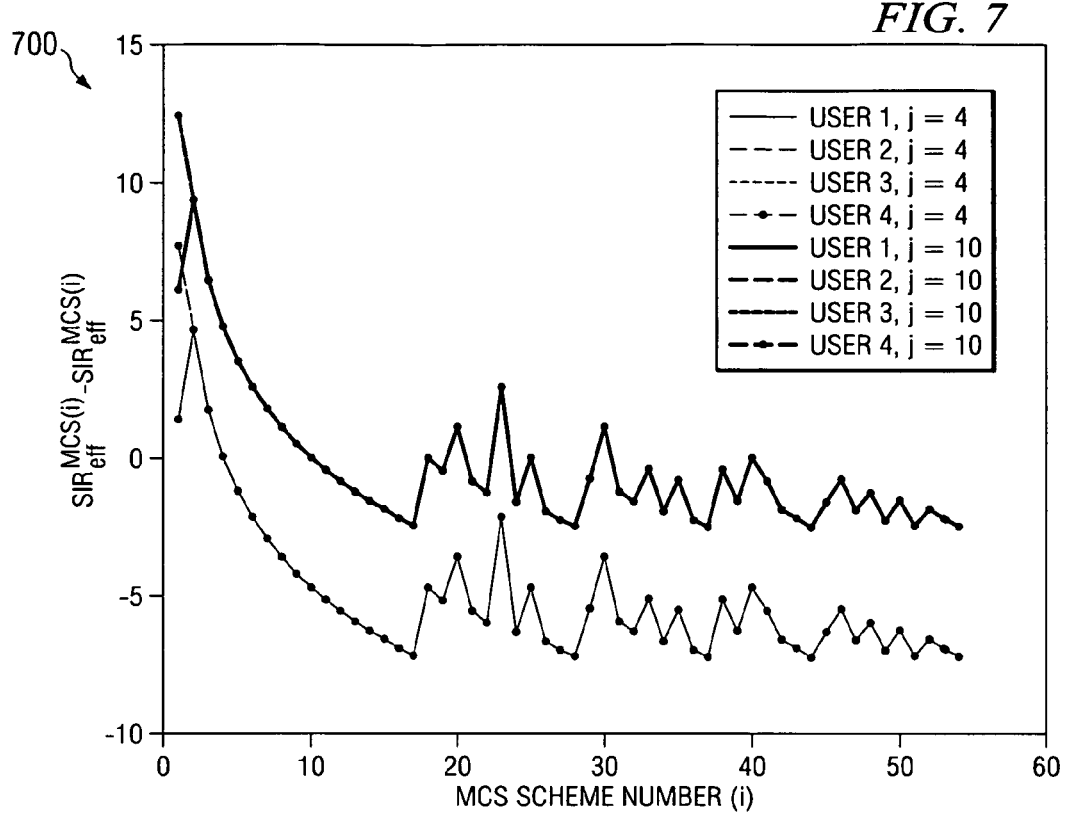
FIG. 7 illustrates a graph showing plots representing capacity-based effective SIR metrics using different schemes plotted for different channel realizations.

FIG. 7 illustrates a graph 700 showing plots representing capacity-based effective SIR metrics using different schemes plotted for different channel realizations. Note that across different channel realizations for different users, the difference between the two plots remains relatively constant. The choice of the reference MCS scheme is varied and a similar behavior is seen. Here the $I_{or}/I_{oc}$ value considered is zero dB.

Figure 8A:
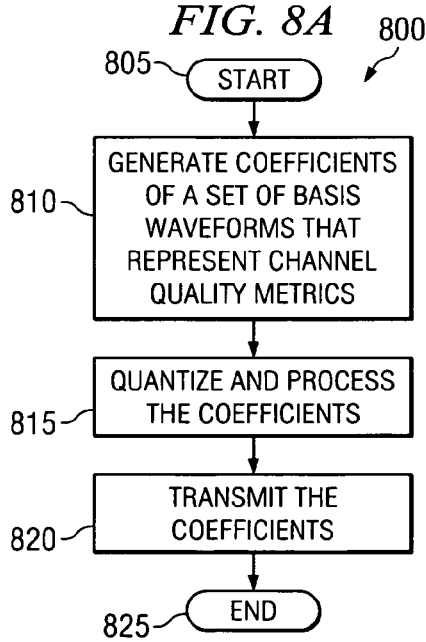
FIGS. 8A and 8B illustrate flow diagrams of respective methods of operating a transmitter and of operating a receiver carried out in accordance with the principles of the present invention.
Figure 8B:
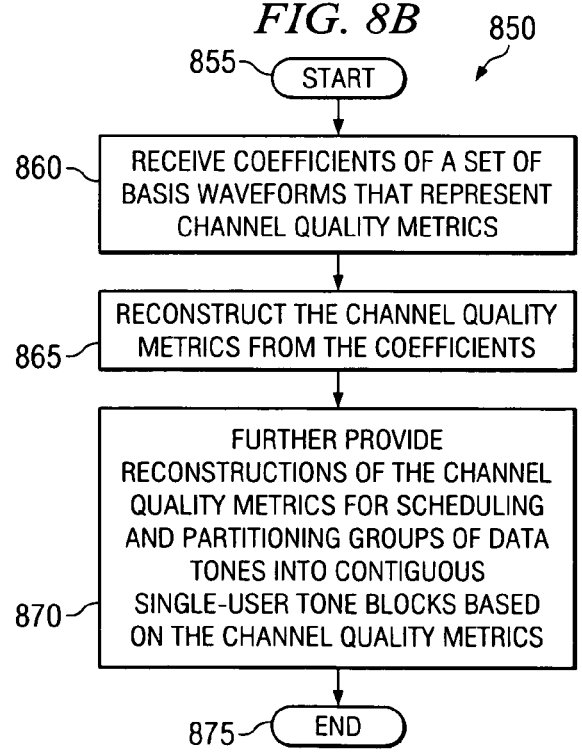

FIGS. 8A and 8B illustrate flow diagrams of respective methods of operating a transmitter and of operating a receiver, generally designated 800 and 850, carried out in accordance with the principles of the present invention.

The method 800 is for use with transmissions associated with channel quality metrics, and in one embodiment, the transmissions are OFDM transmissions. The method 800 starts in a step 805, and then, coefficients of a set of basis waveforms that represent channel quality metrics are generated in a step 810. The basis waveforms employ a sinusoidal-based transform, and in one embodiment, the sinusoidal-based transform is a discrete Fourier transform.

The coefficients of the set of basis waveforms, in the step 810, are correlation coefficients that correspond to channel taps connecting a transmitter to a receiver. The coefficients include a DC coefficient and a first portion of remaining coefficients that is determined by an average speed at which the coefficients decorrelate.

The coefficients are quantized and processed in a step 815 wherein an integer part of the DC coefficient is quantized and scaled employing an integer-part bit set. Similarly, a decimal part of the DC coefficient is quantized and partitioned over an interval from zero to one employing a decimal-part bit set. Additionally, scaled versions of real and imaginary parts of the first portion of remaining coefficients are quantized and partitioned with corresponding real-part and imaginary-part bit sets based on employing a dynamic range corresponding to long term channel statistics. The coefficients are transmitted in a step 820, and the method 800 ends in a step 825.

The method 850 is for use with receptions associated with channel quality metrics and in one embodiment, the receptions are OFDM receptions. The method 850 starts in a step 855, and then, coefficients of a set of basis waveforms that represent channel quality metrics are received in a step 860. In a step 865, the channel quality metrics are reconstructed from the coefficients.

Reconstructions of the channel quality metrics are further provided for scheduling and partitioning groups of data tones into contiguous single-user tone blocks based on the channel quality metrics, in a step 870. Each of the contiguous single-user tone blocks employs one of a set of larger fixed-user data tone groups and smaller contiguous data tone groups. Additionally, modulation and coding schemes employed for portions of the data tone groups within the contiguous single-user tone blocks are grouped to form interpolated modulation and coding scheme values for the portions of the data tone groups.

A modulation coding scheme table for use in single rate communication is also employed that allows reconstruction of corresponding pairs of channel quality indicators and modulation coding schemes based on the user feeding back a single channel quality indication corresponding to a given modulation coding scheme. The method 850 ends in a step 875.

While the methods disclosed herein have been described and shown with reference to particular steps performed in a particular order, it will be understood that these steps may be combined, subdivided, or reordered to form equivalent methods without departing from the teachings of the present invention. Accordingly, unless specifically indicated herein, the order or the grouping of the steps is not a limitation of the present invention.

In summary, embodiments of the present invention employing a transmitter and a receiver, methods of operating a transmitter and a receiver and a communications system employing the transmitter, the receiver and the methods have been presented. For per-tone rate control, advantages include an efficient uplink feedback technique that transmits the expansion coefficients of the carrier-to-interference profile to the base station. The expansion coefficients are the correlation coefficients of the filter taps modeling the channel. Being second-order statistics, they are less prone to variation than a conventional technique that feeds back the filter taps themselves.

An efficient downlink scheduler that groups the tones into the B largest contiguous groups so as to minimize the amount of feedback has also been presented. This scheduler provides the MCSs within a tone group having C largest contiguous sub-groups. Also, an adaptive MCS set reduction strategy which depends on the knowledge of $I_{or}/I_{oc}$ has been presented.

Simulations have been provided to illustrate the relative advantages of the techniques as compared to conventional strategies. It is shown that with 34 bits of uplink feedback and 220 bits of downlink scheduling, an average throughput within 10 percent of the ideal throughput is achievable, even at very low $I_{or}/I_{oc}$ values.

For single-rate control, another efficient uplink feedback technique employing a channel quality indicator of the different modulation and coding schemes in the MCS set has been presented. This feedback technique requires the transmission of the CQI of only one modulation and coding scheme and is able to reproduce, with high accuracy, the CQI table at the base station with this information alone. Using simulation, it was shown that the average throughput of this feedback scheme is within five percent of the average throughput of a per-tone rate control system.

Although the present invention has been described in detail, those skilled in the art should understand that they can make various changes, substitutions and alterations herein without departing from the spirit and scope of the invention in its broadest form. For instance, instead of employing per-tone rate control, a system can perform per-group rate control where a group refers to a group of tones.

What is claimed is:

1. A transmitter, comprising:
    a coefficient circuit configured to generate coefficients of a set of basis waveforms that represent channel quality metrics; and
    a transmit circuit that transmits said coefficients, wherein said coefficients include a DC coefficient and a first portion of remaining coefficients that is determined by an average speed at which said coefficients decorrelate.

2. The transmitter as recited in claim 1 wherein said transmitter is an OFDM transmitter.

3. The transmitter as recited in claim 1 wherein said basis waveforms employ a sinusoidal-based transform.

4. The transmitter as recited in claim 3 wherein said sinusoidal-based transform is a discrete Fourier transform.

5. The transmitter as recited in claim 1 wherein said coefficients are correlation coefficients that correspond to channel taps connecting said transmitter to a receiver.

6. The transmitter as recited in claim 1 wherein an integer part of said DC coefficient is quantized and scaled employing an integer-part bit set, and a decimal part of said DC coefficient is quantized and partitioned over an interval from zero to one employing a decimal-part bit set.

7. The transmitter as recited in claim 1 wherein scaled versions of real and imaginary parts of said first portion of remaining coefficients are quantized and partitioned with corresponding real-part and imaginary-part bit sets based on employing a dynamic range corresponding to long term channel statistics.

8. A method of operating a transmitter, comprising:
generating coefficients of a set of basis waveforms that represent channel quality metrics, said coefficients including a DC coefficient and a first portion of remaining coefficients that is determined by an average speed at which said coefficients decorrelate, and
transmitting said coefficients, wherein said generating and said transmitting are performed by a transmitter.

9. The method as recited in claim 8 wherein said transmitter is an OFDM transmitter.

10. The method as recited in claim 8 wherein said basis waveforms employ a sinusoidal-based transform.

11. The method as recited in claim 10 wherein said sinusoidal-based transform is a discrete Fourier transform.

12. The method as recited in claim 8 wherein said coefficients are correlation coefficients that correspond to channel taps connecting said transmitter to a receiver.

13. The method as recited in claim 8 wherein an integer part of said DC coefficient is quantized and scaled employing an integer-part bit set, and a decimal part of said DC coefficient is quantized and partitioned over an interval from zero to one employing a decimal-part bit set.

14. The method as recited in claim 8 wherein scaled versions of real and imaginary parts of said first portion of remaining coefficients are quantized and partitioned with corresponding real-part and imaginary-part bit sets based on employing a dynamic range corresponding to long term channel statistics.

15. A receiver, comprising:
a receive circuit configured to receive coefficients of a set of basis waveforms that represent channel quality metrics, said coefficients including a DC coefficient and a first portion of remaining coefficients that is determined by an average speed at which said coefficients decorrelate; and
a reconstruction circuit configured to reconstruct said channel quality metrics from said coefficients.

16. The receiver as recited in claim 15 wherein said receiver is an OFDM receiver.

17. The receiver as recited in claim 15, further comprising a coordination circuit coupled to said reconstruction circuit and configured to provide reconstructions of said channel quality metrics for scheduling and to partition groups of data tones into contiguous single-user tone blocks based on said channel quality metrics.

18. The receiver as recited in claim 17 wherein each of said contiguous single-user tone blocks employs one of a set of larger fixed-user data tone groups and smaller contiguous data tone groups.

19. The receiver as recited in claim 18 wherein modulation and coding schemes employed for portions of said data tone groups within said contiguous single-user tone blocks are grouped to form interpolated modulation and coding scheme values for said portions of said data tone groups.

20. The receiver as recited in claim 15 further comprising a modulation coding scheme table for use in single rate communication that allows reconstruction of corresponding pairs of channel quality metrics and modulation coding schemes based on feeding back a single channel quality metric corresponding to a given modulation coding scheme.

21. A method of operating a receiver, comprising:
receiving coefficients of a set of basis waveforms that represent channel quality metrics, said coefficients including a DC coefficient and a first portion of remaining coefficients that is determined by an average speed at which said coefficients decorrelate; and
reconstructing said channel quality metrics from said coefficients, wherein said receiving and said reconstructing are performed by a receiver.

22. The method as recited in claim 21 wherein said receiver is an OFDM receiver.

23. The method as recited in claim 21, further comprising providing reconstructions of said channel quality metrics for scheduling and partitioning groups of data tones into contiguous single-user tone blocks based on said channel quality metrics.

24. The method as recited in claim 23 wherein each of said contiguous single-user tone blocks employs one of a set of larger fixed-user data tone groups and smaller contiguous data tone groups.

25. The method as recited in claim 24 wherein modulation and coding schemes employed for portions of said data tone groups within said contiguous single-user tone blocks are grouped to form interpolated modulation and coding scheme values for said portions of said data tone groups.

26. The method as recited in claim 21 further comprising employing a modulation coding scheme table for use in single rate communication that allows reconstruction of corresponding pairs of channel quality metrics and modulation coding schemes based on feeding back a single channel quality metric corresponding to a given modulation coding scheme.

27. A communications system, comprising:
a transmitter, including:
a coefficient circuit that generates coefficients of a set of basis waveforms, which represent channel quality metrics, said coefficients including a DC coefficient and a first portion of remaining coefficients that is determined by an average speed at which said coefficients decorrelate, and
a transmit circuit that transmits said coefficients; and
a receiver, including:
a receive circuit that receives said coefficients, and
a reconstruction circuit that reconstructs said channel quality metrics from said coefficients.

28. The system as recited in claim 27 wherein said system is an OFDM system.

29. The system as recited in claim 27 wherein said basis waveforms employ a sinusoidal-based transform.

30. The system as recited in claim 29 wherein said sinusoidal-based transform is a discrete Fourier transform.

31. The system as recited in claim 27 wherein said coefficients are correlation coefficients that correspond to channel taps connecting said transmitter to said receiver.

32. The system as recited in claim 27 wherein an integer part of said DC coefficient is quantized and scaled employing an integer-part bit set, and a decimal part of said DC coefficient is quantized and partitioned over an interval from zero to one employing a decimal-part bit set.

33. The system as recited in claim 27 wherein scaled versions of real and imaginary parts of said first portion of remaining coefficients are quantized and partitioned with corresponding real-part and imaginary-part bit sets based on employing a dynamic range corresponding to long term channel statistics.

34. The system as recited in claim 27, further comprising a coordination circuit coupled to said reconstruction circuit that provides reconstructions of said channel quality metrics for scheduling and partitions groups of data tones into contiguous single-user tone blocks based on said channel quality metrics.

35. The system as recited in claim 34 wherein each of said contiguous single-user tone blocks employs one of a set of larger fixed-user data tone groups and smaller contiguous data tone groups.

36. The system as recited in claim 35 wherein modulation and coding schemes employed for portions of said data tone groups within said contiguous single-user tone blocks are grouped to form interpolated modulation and coding scheme values for said portions of said data tone groups.

37. The system as recited in claim 27 further comprising a modulation coding scheme table for use in single rate communication that allows reconstruction of corresponding pairs of channel quality metrics and modulation coding schemes based on feeding back a single channel quality metric corresponding to a given modulation coding scheme.

* * * * *

UNITED STATES PATENT AND TRADEMARK OFFICE
CERTIFICATE OF CORRECTION

| | | |
|---|---|---|
| PATENT NO. | : 7,649,960 B2 | Page 1 of 1 |
| APPLICATION NO. | : 11/379003 | |
| DATED | : January 19, 2010 | |
| INVENTOR(S) | : Raghavan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-eighth Day of December, 2010

David J. Kappos
*Director of the United States Patent and Trademark Office*